US012616984B2

(12) United States Patent
Wang et al.

(10) Patent No.: US 12,616,984 B2
(45) Date of Patent: May 5, 2026

(54) PROGRAMMABLE AIR SUPPLY SYSTEM WITH LIQUID COOLING AND NOISE SUPPRESSION

(71) Applicant: GloryMakeup Inc., Taipei City (TW)

(72) Inventors: Pao-Tang Wang, Taipei City (TW); Daniel Ariel Donohue, Miami, FL (US)

(73) Assignee: GloryMakeup Inc., Taipei City (TW)

( * ) Notice: Subject to any disclaimer, the term of this patent is extended or adjusted under 35 U.S.C. 154(b) by 254 days.

(21) Appl. No.: 18/487,383

(22) Filed: Oct. 16, 2023

(65) Prior Publication Data

US 2025/0121387 A1 Apr. 17, 2025

(51) Int. Cl.
*F04D 29/66* (2006.01)
*B05B 7/24* (2006.01)
*F04D 27/00* (2006.01)

(52) U.S. Cl.
CPC .......... *B05B 7/2491* (2013.01); *F04D 27/004* (2013.01); *F04D 29/663* (2013.01)

(58) Field of Classification Search
CPC ... B05B 7/2491; F04D 27/004; F04D 29/663; F04D 29/668; F04D 1/00; F04D 13/06; F04D 15/0066; F04B 35/006; F04B 39/0033; F04B 39/0044; F04B 39/06; F04B 39/121; F04B 49/06; F04B 49/20; F04B 49/225; F04B 39/127; F04B 35/04; F04C 23/008; F04C 2230/604; F04C 18/16; F04C 18/356; F04C 18/3562; F04C 18/3564; F04C 2210/24; F16F 15/08; F16F 1/3615; F16F 1/3732; F16F 1/376; F16F 15/02; F16F 15/046; F16F 15/067; F16F 2230/0041; F16F 2230/0058; F16F 7/1028; F16F 7/104
USPC .................................................. 417/44.1, 363
See application file for complete search history.

(56) References Cited

U.S. PATENT DOCUMENTS

| | | | | | |
|---|---|---|---|---|---|
| 1,845,551 | A * | 2/1932 | Mitzi | H02K 5/1672 | 248/568 |
| 1,998,338 | A * | 4/1935 | Spohrer | F04B 41/02 | 417/415 |
| 2,139,996 | A * | 12/1938 | Buchanan | F25B 31/006 | 417/372 |
| 2,177,795 | A * | 10/1939 | Von Delden | F04B 17/04 | 92/138 |

(Continued)

*Primary Examiner* — Mark A Laurenzi
*Assistant Examiner* — Benjamin Doyle
(74) *Attorney, Agent, or Firm* — Tong J. Lee

(57) ABSTRACT

An air supply system includes an air pump assembly to generate compressed air, a liquid circulation pipe to circulate a cooling liquid, a sensor, and a programmable control board. The air pump assembly includes an outer sealed box enclosing an inner sealed box, which further encloses air pump machinery. A first set of springs are disposed between the air pump machinery and the inner sealed box and a second set of springs are disposed between the outer sealed box and the inner sealed box. The liquid circulation pipe connects the air pump machinery to liquid cooling components outside the outer sealed box. The sensor is coupled to an output of the air pump assembly to measure a characteristic of the compressed air during operation. The programmable control board controls the speed of a motor in the air pump machinery according to program instructions and measurements of the sensor.

18 Claims, 6 Drawing Sheets

(56) References Cited

U.S. PATENT DOCUMENTS 2,233,102 A * 2/1941 Kucher ................. F25D 23/006 248/613
2,349,845 A * 5/1944 Cody .................... F04B 39/127 417/419
2,359,916 A * 10/1944 Hussman ................. A45D 4/10 96/381
2,451,903 A * 10/1948 Bauman ................ F25D 17/062 236/1 R
2,961,149 A * 11/1960 Hull ...................... F04B 45/047 92/99
3,182,902 A * 5/1965 Foris ..................... F04B 39/127 417/363
3,300,125 A * 1/1967 Winkler ................ F04B 39/127 417/363
3,385,542 A * 5/1968 Enemark ............... F04B 39/127 417/363
3,955,900 A * 5/1976 Vinci ...................... F04B 39/12 417/415
4,105,374 A * 8/1978 Scharf ................... F01C 21/104 417/415
4,205,537 A * 6/1980 Dubberley ................ F25B 1/00 417/902
4,396,360 A * 8/1983 Elson ...................... F04B 41/06 417/363
4,516,044 A * 5/1985 Bone ...................... H02K 5/203 165/169
4,984,971 A * 1/1991 Bergeron .............. F04B 39/127 417/363
5,038,853 A * 8/1991 Callaway, Sr. ........ H02K 5/203 165/47
5,118,262 A * 6/1992 Kuo .................... F04B 39/0033 417/363
5,277,554 A * 1/1994 Elson ...................... F04B 39/00 417/363
5,306,121 A * 4/1994 Heflin ..................... F16F 15/08 417/363
5,435,702 A * 7/1995 Koyama .................. H02K 7/04 417/902
5,839,295 A * 11/1998 Lehmann .............. F25B 39/022 62/295
5,913,892 A * 6/1999 Kwon ................... F25D 23/006 62/297
6,260,373 B1 * 7/2001 Rockwood .............. F16F 7/104 165/69
6,336,794 B1 * 1/2002 Kim .................... F04B 39/0044 417/363
7,263,851 B2 * 9/2007 Yun ....................... F25D 23/006 181/207
7,325,412 B2 * 2/2008 Yun ....................... F25D 23/006 248/188.4
7,465,156 B2 * 12/2008 Lee ..................... F04B 39/0044 417/363
7,814,760 B2 * 10/2010 Immel ................ H05K 7/20172 415/140
8,328,524 B2 * 12/2012 Iimura .................... F04B 41/02 417/18
8,794,941 B2 * 8/2014 Santos .................. F01C 21/001 418/270
10,731,648 B2 * 8/2020 Mehta ................... F04C 29/065
2007/0110606 A1 * 5/2007 Stock .................... F04D 29/582 418/88
2007/0154319 A1 * 7/2007 Stiles, Jr. .............. F04B 49/065 417/42
2008/0023896 A1 * 1/2008 Brewster ............... F04D 29/668 267/140.11
2010/0172769 A1 * 7/2010 Lilie ..................... F04B 35/045 417/363
2015/0086392 A1 * 3/2015 Thomes .................. F04B 39/06 417/228
2015/0338141 A1 * 11/2015 Troxell ................. F25D 23/006 62/77
2016/0195080 A1 * 7/2016 Miguel ................... F04B 53/14 417/540
2018/0087494 A1 * 3/2018 Brune ..................... F04B 17/03
2019/0032967 A1 * 1/2019 Bhatia ........................ F25B 1/04
2019/0093645 A1 * 3/2019 Lee ....................... F04B 35/045
2020/0263883 A1 * 8/2020 Zhou ......................... F24F 1/12
2021/0025643 A1 * 1/2021 Hisayama ............... F16F 15/08
2021/0140439 A1 * 5/2021 Da Silva Castro ..... F04D 25/06
2021/0190056 A1 * 6/2021 Brown .................... F04B 39/06
2021/0239105 A1 * 8/2021 Allard ................... F04B 39/121
2021/0246892 A1 * 8/2021 Mitchell ............... F04B 39/066
2021/0363982 A1 * 11/2021 Schögler ............. F04B 39/0284
2022/0413523 A1 * 12/2022 Yan ...................... B01D 53/263
2023/0027815 A1 * 1/2023 Elsaadani ............... F04B 35/04
2023/0052219 A1 * 2/2023 Yaegashi ................. F16F 15/08
2023/0054192 A1 * 2/2023 Tack ..................... F04B 39/121
2023/0213025 A1 * 7/2023 Hahn .................... F25B 31/023 62/498
2024/0409065 A1 * 12/2024 Lee ........................... B60S 1/56
2025/0020373 A1 * 1/2025 Hisayama ............... F16F 15/08

* cited by examiner

PROGRAMMABLE AIR SUPPLY SYSTEM WITH LIQUID COOLING AND NOISE SUPPRESSION

TECHNICAL FIELD

Embodiments of the invention relate to a compact pressurized air supply system that includes mechanisms for noise suppression and heat dissipation.

BACKGROUND OF THE INVENTION

Conventional compact pressurized air supply systems, such as a tabletop or a portable air pump, typically have many drawbacks. For example, conventional compact air pumps often do not have an effective mechanism for blocking the noise generated during operation. The noise generated by the air pump can be unpleasant and annoying to users and people in the immediate vicinity.

Furthermore, heat generated during the operation of a conventional compact air pump is often poorly controlled. The air pump may need to be shut down after it is used continuously for a long time. The shutdown disrupts the continuity of the work process.

A conventional compact air pump also has the problem of imprecise and inconsistent control of the air pressure that it outputs. For example, some conventional compact air pumps control the air pressure by stopping the air pump operation when the air pressure reaches a target, and restarting the air pump operation when the air pressure is insufficient. Frequent starting and restarting of the air pump cause instantaneous high current, which can affect the lifespan of the air pump parts. Therefore, there is a need for improving the design and operation of conventional compact air pumps.

SUMMARY OF THE INVENTION

In one embodiment, an air supply system is provided for supplying compressed air. The air supply system includes an air pump assembly to generate the compressed air. The air pump assembly includes an outer sealed box enclosing an inner sealed box, and the inner sealed box further encloses air pump machinery. A first set of springs are disposed between the air pump machinery and the inner sealed box and a second set of springs are disposed between the outer sealed box and the inner sealed box. The air supply system further includes a liquid circulation pipe to circulate a cooling liquid. The liquid circulation pipe connects the air pump machinery to liquid cooling components outside the outer sealed box. The air supply system further includes a sensor coupled to an output of the air pump assembly to measure a characteristic of the compressed air during operation of the air pump machinery, and a programmable control board to control a speed of a motor in the air pump machinery according to program instructions and measurements of the sensor.

In another embodiment, an air supply system includes an air pump assembly, a liquid circulation pipe, a sensor, a programmable control board, and an air output valve. The air pump assembly includes air pump machinery to generate compressed air. The air pump assembly includes an outer sealed box enclosing an inner sealed box, and the inner sealed box further encloses the air pump machinery. A first set of springs are disposed between the air pump machinery and the inner sealed box and a second set of springs are disposed between the outer sealed box and the inner sealed box. The liquid circulation pipe circulates a cooling liquid.

The liquid circulation pipe connects the air pump machinery to liquid cooling components outside the outer sealed box. The sensor is coupled to an output of the air pump assembly to measure a characteristic of the compressed air during operation of the air pump machinery. The programmable control board controls the speed of a motor in the air pump machinery according to program instructions and measurements of the sensor. The air output valve is coupled to the output of the air pump assembly and an input of a spraying device. The air output valve is controlled by commands of the programmable control board.

Other aspects and features will become apparent to those ordinarily skilled in the art upon review of the following description of specific embodiments in conjunction with the accompanying figures.

BRIEF DESCRIPTION OF DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION OF THE INVENTION

Figure 1:
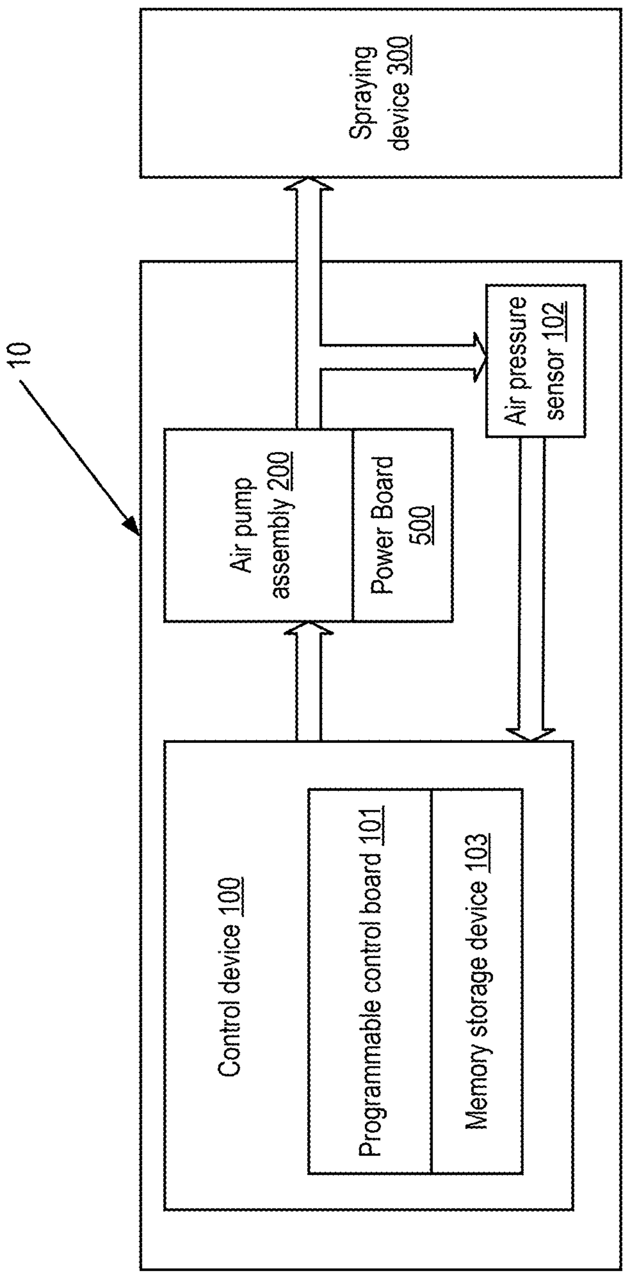
FIG. 1 is a schematic diagram of an air supply system according to one embodiment.

In the following description, numerous specific details are set forth. However, it is understood that embodiments of the invention may be practiced without these specific details. In other instances, well-known circuits, structures, and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

This disclosure describes a programmable pressure-regulating air supply system. The system provides pressurized air (also referred to as compressed air) to a spraying device, which may be a handheld spraying device or a spraying device used in an automatic makeup machine. The air supply system includes an air pump assembly coupled to a programmable control device. A sensor in real time measures a characteristic of the compressed air (e.g., air pressure) in an air outlet tube of the air supply system. The sensed air pressure is sent back to the control device for interpretation, according to which the control device sends a control signal to the air pump assembly to adjust the air pressure. When the air pressure is below a low threshold, the control signal causes the speed of the air pump motor to increase. When the air pressure is above a high threshold, the control signal causes the speed of the air pump motor to decrease. The control device also sends commands to an air outlet valve, such as a solenoid valve, to control the opening and closing of the valve. The solenoid valve may be driven by current or air pressure. The air supply system may be connected to a spraying device. When the valve's output port is opened, the air supply system outputs compressed air to the spraying device. When the valve's output port is closed, the compressed air flow to the spraying device stops. In one embodiment, the valve may additionally include an exhaust port for releasing air to the environment. As such, the air pump can keep running continuously during use, which prolongs the life of the air pump parts. There is no need to start and shut down the air pump frequently.

In one embodiment, the air pump assembly includes air pump machinery inside two or more sealed boxes; e.g., an inner sealed box and an outer sealed box. The sealed boxes may be made of metal or hard plastics to reduce the resonance effect of sound waves on the material. A first set of springs are disposed between the air pump machinery and the inner sealed box, and a second set of springs are disposed between the outer sealed box and the inner sealed box. The first set of springs absorb the vibration generated during the operation of the air pump machinery to reduce the vibration transmitted to the inner sealed box. The inner sealed box confines the noise generated by the air pump operation within the inner sealed box. The second set of springs absorb the vibration of the inner sealed box and reduce the vibration transmitted to the outer sealed box. The outer sealed box confines the noise generated by the vibration of the inner sealed box within the outer sealed box to achieve noise reduction effect. In one embodiment, the air pump machinery may be inside of more than two sealed boxes. The sealed boxes have decreasing sizes and form a set of nested boxes. A set of springs are installed between any adjacent two of the sealed boxes. The sealed boxes are compact in size. As a non-limiting example, an inner sealed box may have a diameter or diagonal length of 100-150 millimeter with 150-200 millimeter in height, and an outer seal box may have a diameter or diagonal length of 150-200 millimeter with 200-250 millimeter in height.

In one embodiment, the system includes an air inlet pipe and an air outlet pipe to deliver air in and out of the air pump machinery through the inner sealed box and the outer sealed box. The system also includes a liquid circulation pipe that carries a cooling liquid to dissipate the heat generated by the air pump machinery outside the outer sealed box. In one embodiment, the air inlet pipe, the air outlet pipe, and the liquid circulation pipe are made of flexible materials to reduce vibration transmission. These pipes pass through respective holes on the walls of the inner sealed box and the outer sealed box. Any gaps between the pipes and the holes are tightly sealed.

FIG. 1 is a schematic diagram of a programmable pressure-regulating air supply system ("system 10") according to one embodiment. In this embodiment, system 10 includes a programmable control device 100 ("control device 100") and an air pump assembly 200. Control device 100 includes a programmable control board 101, which is a circuit board including processing circuitry operative to process input instructions and signals, and generate output control signals and commands. Control device 100 also includes a memory storage device 103 to store configurations of system 10 and instructions executable by programmable control board 101. Control device 100 receives input from an air pressure sensor 102, which detects air pressure conditions of the pressurized air output from air pump assembly 200. Alternatively, system 10 may include a gas flow meter to measure the flow rate of the compressed air during operation of the air pump machinery. A different sensor or measurement device may also be used in place of air pressure sensor 102. Programmable control board 101 may convert the measurement or sensing data into air pressure or another quantifiable indicator to adjust the air pump motor speed.

In one embodiment, programmable control board 101 may include a microprocessor, a microcontroller, a digital signal processor, a microcomputer, a central processing unit, a logic circuit, an analog circuit, a digital circuit and any device that operates according to operation instructions. Memory storage device 103 can be read-only memory, non-permanent memory, permanent memory, static memory, dynamic memory, flash memory, and any device that stores digital information.

Air pump assembly 200 may supply compressed air to a spraying device 300, which may be part of an automatic makeup machine. As will be described in further detail below, air pump assembly 200 is equipped with mechanisms for noise reduction and heat dissipation.

In one embodiment, air pump assembly 200 receives electricity from a power source such as a power board 500. In one embodiment, power board 500 may be attached to air pump assembly 200. Power board 500 may supply power to the entire system 10.

Figure 2:
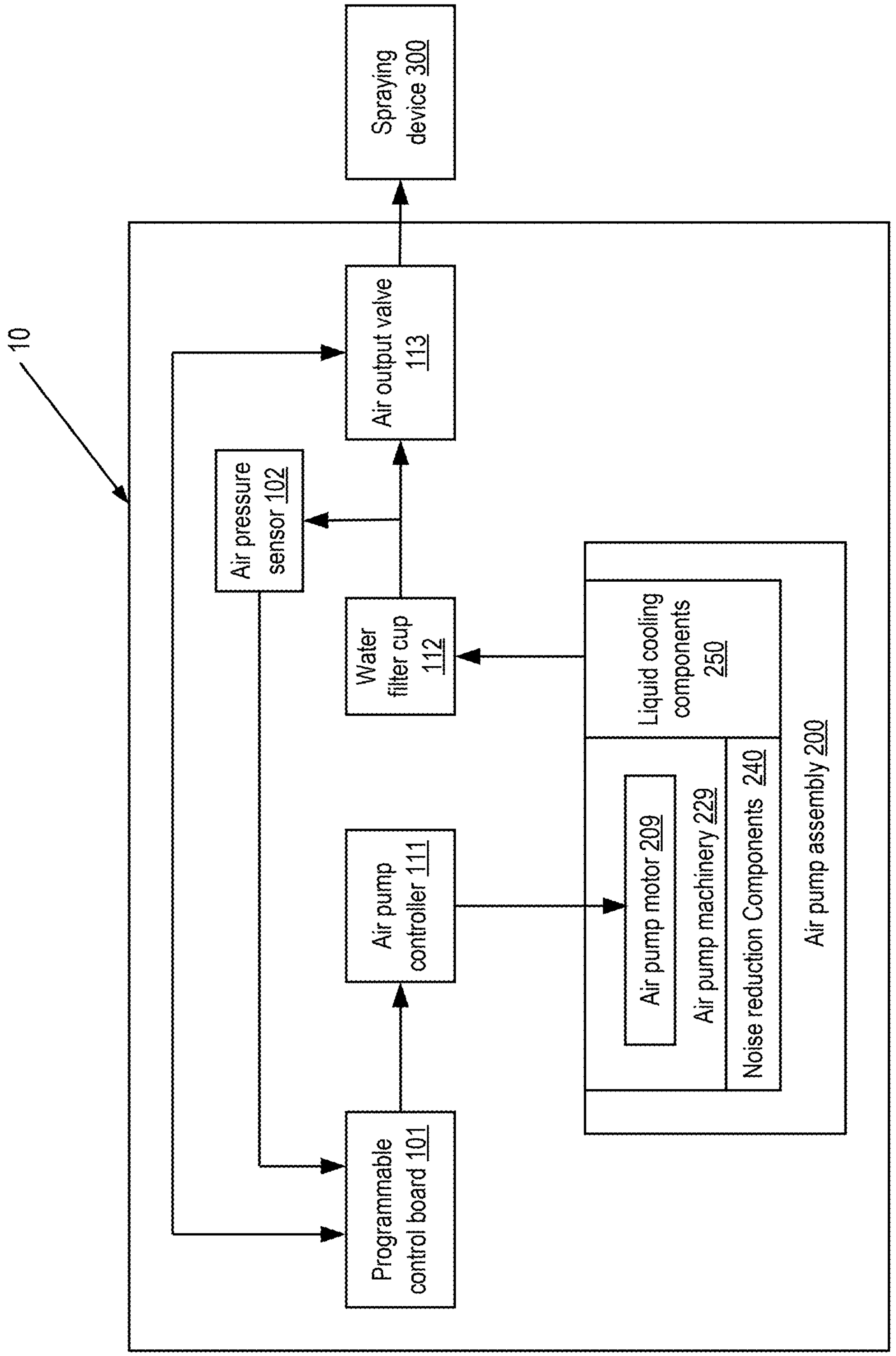
FIG. 2 is a schematic diagram of the air supply system of FIG. 1 in more detail according to one embodiment.

FIG. 2 is a schematic diagram of system 10 in more detail according to one embodiment. In this embodiment, programmable control board 101 receives an air pressure measurement returned by air pressure sensor 102 and compares the measurement with a predetermined value. If the sensed air pressure is greater than the predetermined value or a high threshold value, programmable control board 101 sends a control signal to air pump controller 111 to reduce the rotational speed of an air pump motor 209. If the sensed air pressure is lower than the predetermined value or a low threshold value, programmable control board 101 sends a control signal to air pump controller 111 to increase the speed of air pump motor 209. The control signal may indicate a programmable value for setting the motor speed. For noise reduction, air pump assembly 200 includes noise reduction components 240 such as springs and two or more sealed boxes to enclose air pump machinery 229. For heat dissipation, air pump assembly 200 includes liquid cooling components 250 to carry away the heat generated by air pump machinery 229. Water condensation caused by air pressurization is collected by a water filter cup 112. The pressurized air is output to spraying device 300 through an air output valve 113, such as a solenoid valve. Operation of air output valve 113 is controlled by programmable control board 101 according to instructions in a program. In one embodiment, air output valve 113 may be a 3-way solenoid valve that has a spray mode and an idle mode. In the spray mode, programmable control board 101 switches the valve's output to spraying device 300 and may speed up air pump motor 209 to increase air pressure. In the idle mode, programmable control board 101 switches the valve's output to an exhaust port to release air to the environment and lowers the speed of air pump motor 209.

Figure 3:
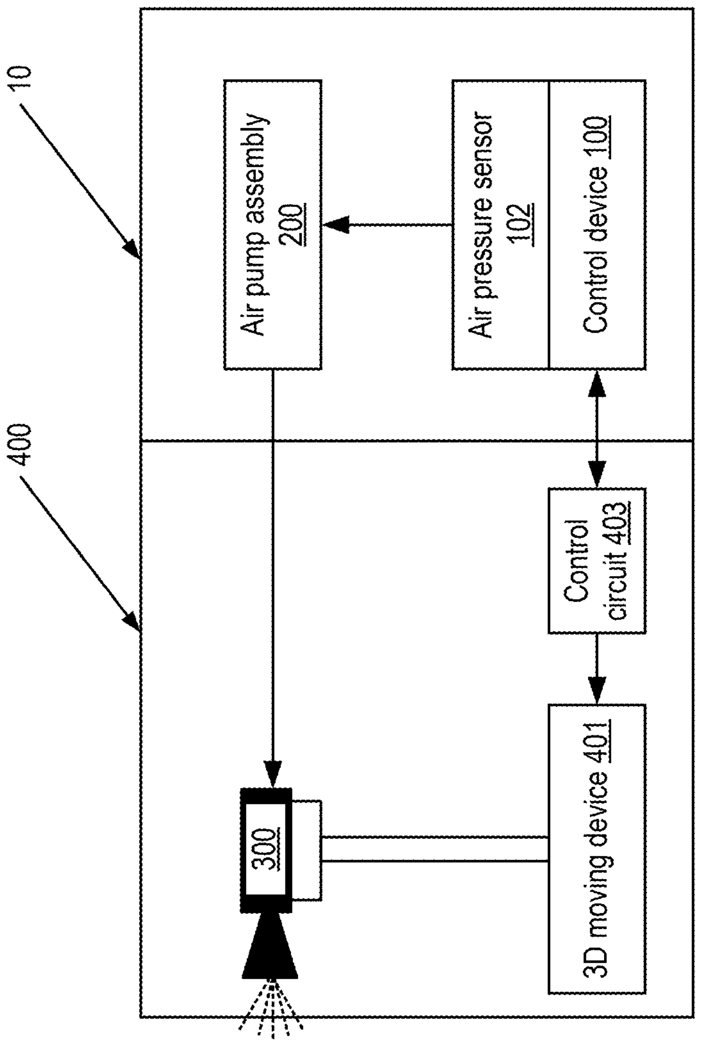
FIG. 3 is a schematic diagram of the air supply system of FIG. 1 connected to a spraying device in an automatic makeup machine according to one embodiment.

FIG. 3 is a schematic diagram of system 10 connected to an automatic makeup machine 400 according to one embodiment. System 10 can be externally connected with automatic makeup machine 400. Automatic makeup machine 400 may spray skin spray products on a user's face, among other uses. Automatic makeup machine 400 includes a three-dimensional (3D) moving device 401, spraying device 300, and a control circuit 403. Control circuit 403 is electrically connected to 3D moving device 401 to control the movement of 3D moving device 401 and spraying device 300. Control circuit 403 is also electrically connected to control device 100 of system 10. Through air pressure sensor 102, the air pressure output from air pump assembly 200 can be detected in real time. Control device 100 provides control signals to air pump assembly 200 according to the program instructions and the air pressure. Air pump assembly 200 outputs compressed air to spraying device 300. Referring also to FIG. 1, programmable control board 101 in control device 100 may receive program instructions from control circuit 403 or memory storage device 103 to control air pump assembly 200 to feed the compressed air to spraying device 300. The compressed air generated by air pump assembly 200 may be fed directly to spraying device 300 without being stored in an air tank.

Control circuit 403 can be implemented by a processing unit coupled to a storage unit. The processing unit may be a microprocessor, a microcontroller, a digital signal processor, a microcomputer, a central processing unit, a logic circuit, an analog circuit, a digital circuit and any device that operates according to operation instructions. The storage unit can be read-only memory, non-permanent memory, permanent memory, static memory, dynamic memory, flash memory, and any device that stores digital information.

Figure 4:
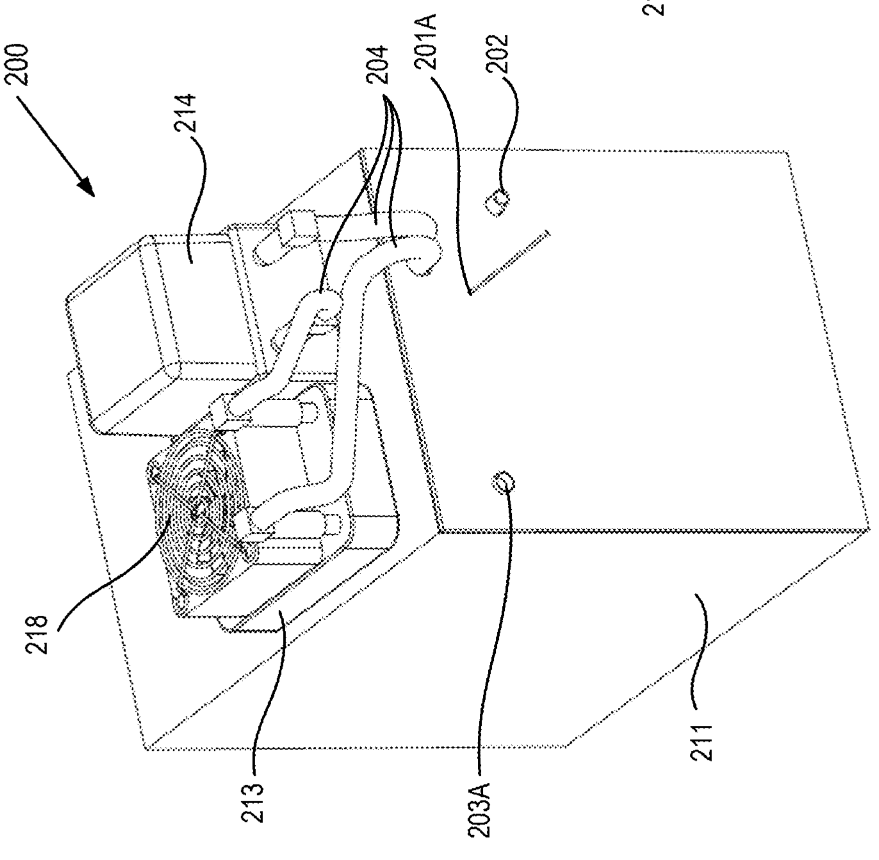
FIG. 4 is a diagram illustrating an exterior view of an air pump assembly according to one embodiment.

FIG. 4 is a diagram illustrating an exterior view of air pump assembly 200 according to one embodiment. Air pump assembly 200 includes an outer sealed box 211, which further includes a power input hole 201A to receive input power, an air outlet tube 202 to output compressed air, and an air inlet hole 203A. Air pump assembly 200 further includes liquid cooling components 250 (FIG. 2) outside outer sealed box 211. Components inside outer sealed box 211 are not shown. Liquid cooling components 250 include heat dissipation fins 213, a liquid pump 214, and a liquid circulation pipe 204. On top of heat dissipation fins 213 is a cooling fan 218. Liquid circulation pipe 204 includes a first segment connecting liquid pump 214 to the interior machinery, a second segment connecting the interior machinery to heat dissipation fins 213, and a third segment connecting heat dissipation fins 213 to liquid pump 214. Cooling liquid in liquid circulation pipe 204 is pumped by liquid pump 214 to carry away the heat generated by the interior machinery of air pump assembly 200 to heat dissipation fins 213.

Figure 5:
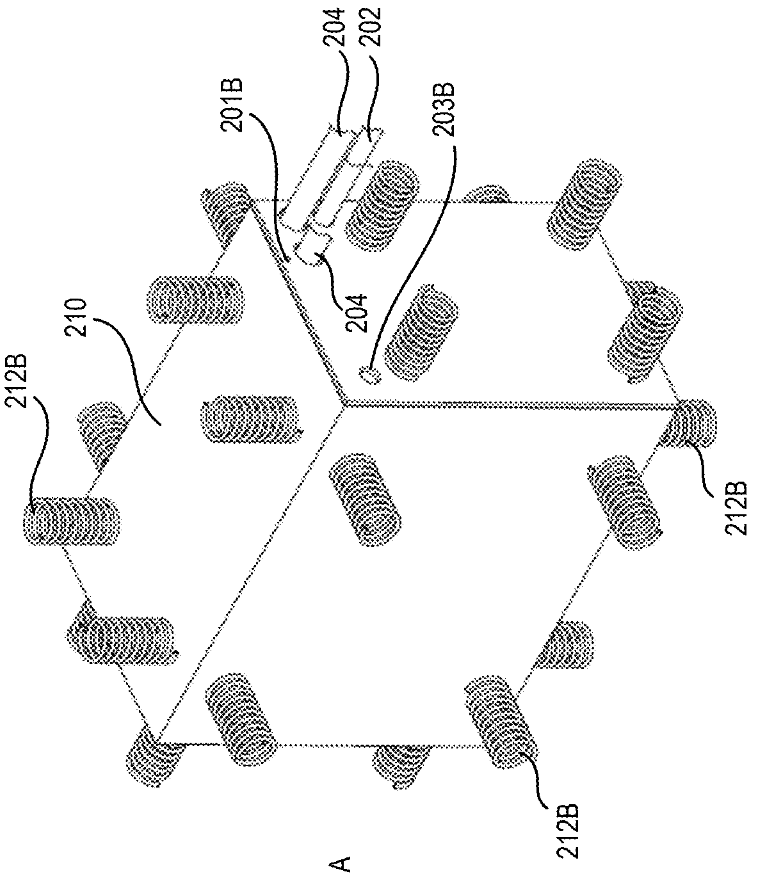
FIG. 5 is a diagram illustrating an inner sealed box according to one embodiment.

FIG. 5 is a diagram illustrating an inner sealed box 210 according to one embodiment. Inner sealed box 210 is located inside of outer sealed box 211 and houses air pump machinery 229 (FIG. 2). Inner sealed box 210 includes a power input hole 201B to receive input power, air outlet tube 202 to output compressed air, and an air inlet hole 203B. An air inlet tube provides input air to air pump machinery 229 through air inlet hole 203A (FIG. 4) on outer sealed box 211 and air inlet hole 203B on inner sealed box 210. Portions of liquid circulation pipe 204 and air outlet tube 202 are shown in this figure. A set of springs 212B are installed between inner sealed box 210 and outer sealed box 211 on all sides of inner sealed box 210 to absorb the air vibration generated when inner sealed box 210 vibrates.

Figure 6:
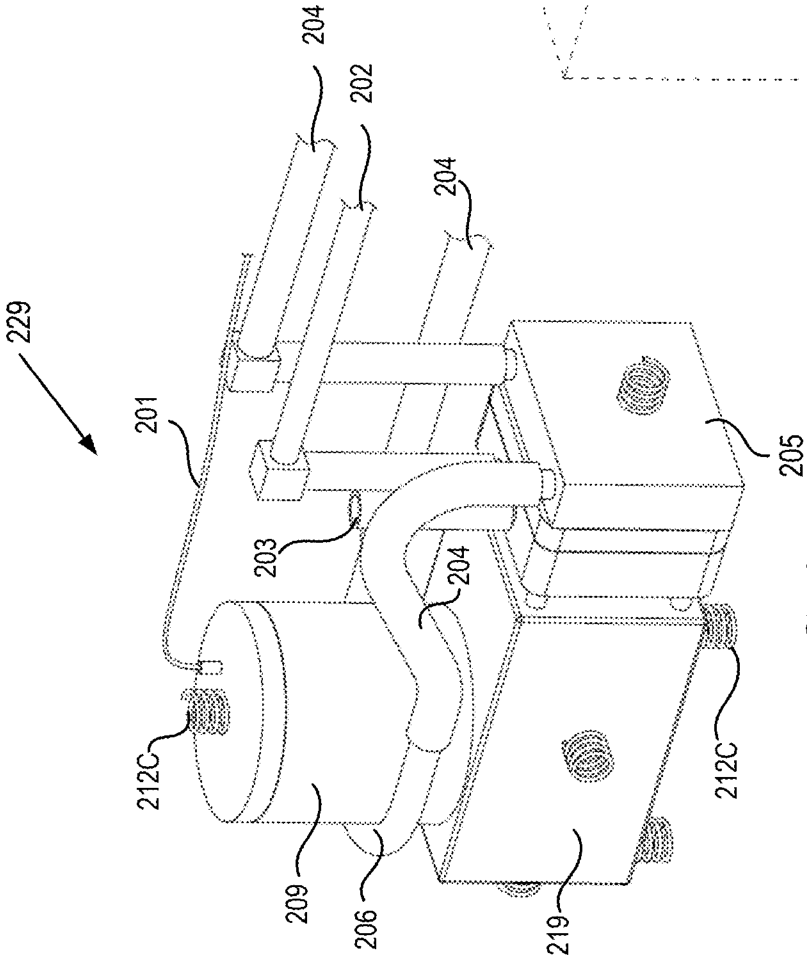
FIG. 6 is a diagram illustrating air pump machinery inside the inner sealed box of FIG. 5 according to one embodiment.

FIG. 6 is a diagram illustrating air pump machinery 229 inside inner sealed box 210 of FIG. 5 according to one embodiment. Air pump machinery 229 includes air pump motor 209, a compressor 219, and a heat-conducting metal box ("metal box 205"). Air pump motor 209 receives electrical power from a power input line 201, which enters outer sealed box 211 and inner sealed box 210 through power input hole 201A (FIG. 4) and power input hole 201B (FIG. 5), respectively. Compressor 219 receives air from an air inlet tube 203, which enters outer sealed box 211 and inner sealed box 210 through air inlet hole 203A (FIG. 4) and air inlet hole 203B (FIG. 5), respectively. A set of springs 212C are installed between air pump machinery 229 around all sides of air pump machinery 229 to absorb the vibration generated during the operation of air pump machinery 229. Thus, springs 212C reduce the vibration transmitted to inner sealed box 210 to thereby achieve the noise reduction effect.

In one embodiment, liquid circulation pipe 204 includes a metal segment (referred to as "metal pipe 206") partially surrounding air pump motor 209. Cooling liquid in liquid circulation pipe 204 flows through metal pipe 206 to carry away the heat generated by air pump motor 209, and continues to flow through metal box 205 for cooling. The cooling liquid in liquid circulation pipe 204 continues to flow to heat dissipation fins 213 (FIG. 4) for heat dissipation. The cooling liquid continuously circulates in liquid circulation pipe 204 during the operation of air pump assembly 200.

Inner sealed box 210 and outer sealed box 211 are sealed. That is, all of the gaps between pipes/tubes and corresponding holes on the walls of boxes 210 and 211 are tightly sealed, and there are no other openings on the boxes 210 and 211. Inner sealed box 210 and outer sealed box 211 provide a closed environment, which blocks the noise generated by air pump machinery 229 to achieve noise reduction. In some embodiments, air pump assembly 200 may include more than two sealed boxes to house air pump machinery 229, with a set of springs between any two adjacent sealed boxes and between air pump machinery 229 and the innermost sealed box.

Figure 7:
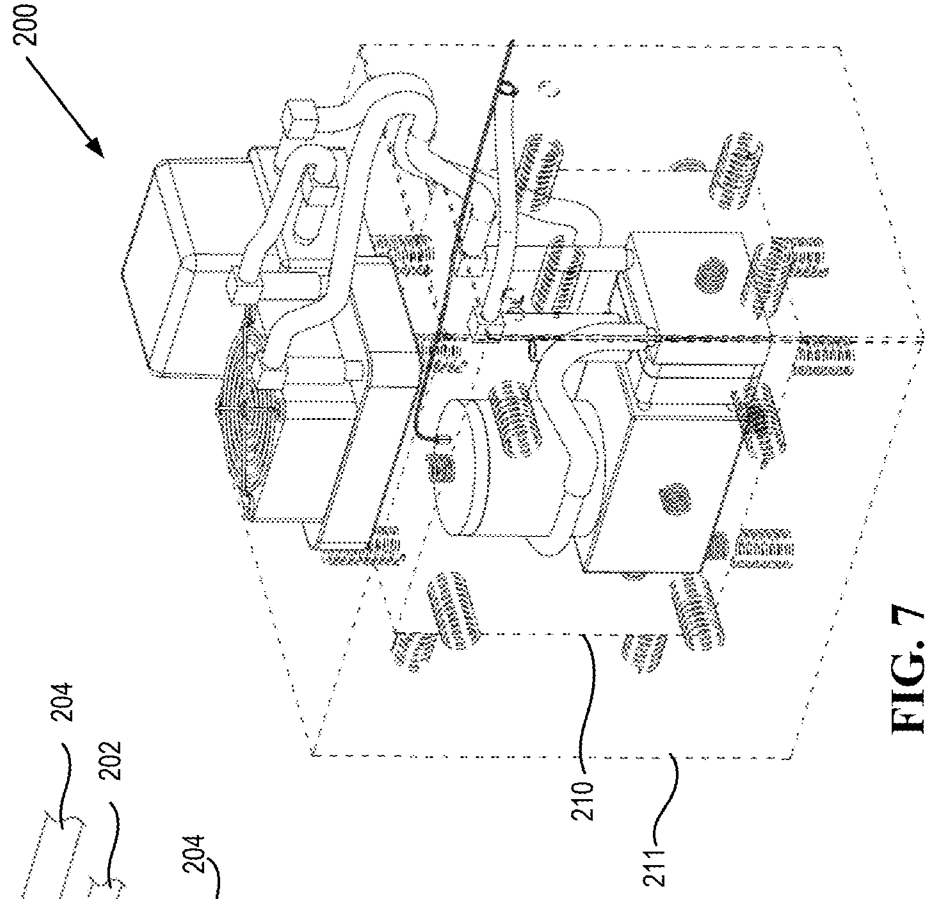
FIG. 7 is a diagram of the air pump assembly of FIG. 4 according to one embodiment.

FIG. 7 is a diagram of air pump assembly 200 of FIG. 4 according to one embodiment. To more clearly show liquid circulation pipe 204 and its connection to air pump machinery 229, inner sealed box 210 and outer sealed box 211 are shown as transparent boxes in dashed lines. It is understood that inner sealed box 210 and outer sealed box 211 may be made of non-transparent materials. In the examples of FIG. 4, FIG. 5, and FIG. 7, each of the sealed boxes 210 and 211 is shown to have the shape of a cube or a cuboid. In alternative embodiments, the seal boxes may have any three-dimensional shape that can accommodate air pump machinery 229. Non-limiting examples of the three-dimensional shape include shapes based on any one of a square (e.g., cube), a rectangle (e.g., cuboid), a circle (e.g., cylinder or sphere), a parallelogram, an oval, and an irregular shape.

Figure 8:
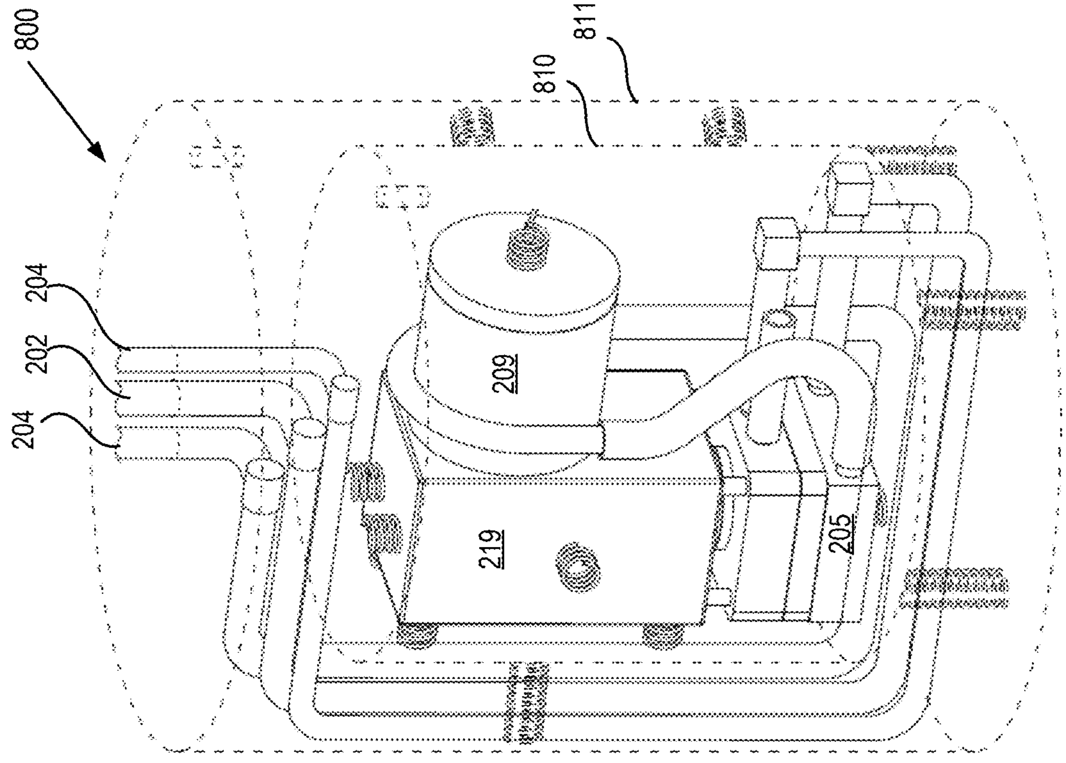
FIG. 8 is a diagram of an air pump assembly according to another embodiment.

FIG. 8 is a diagram of an air pump assembly 800 according to another embodiment. Referring also to FIGS. 4-7, air pump assembly 800 has the same components as air pump assembly 200 except for the shape of sealed boxes and arrangements of air pump machinery 229 and liquid circulation pipe 204. In this example, air pump assembly 800 includes an inner sealed box 810 and an outer sealed box 811, both of which have a cylindrical shape. To simplify the illustration and ease of understanding, inner sealed box 810 and outer sealed box 811 are shown as transparent boxes in dashed lines. It is understood that inner sealed box 810 and outer sealed box 811 may be made of non-transparent materials. In this embodiment, metal box 205 is positioned under compressor 219 and air pump motor 209. Liquid cooling components (e.g., liquid pump 214 and heat dissipation fins 213), which are not shown in this figure, may be located on top of outer sealed box 811. To reach the liquid cooling components, liquid circulation pipe 204 exits inner sealed box 810 and outer sealed box 811 from opposite sides; that is, from the bottom side of inner sealed box 810 and the top side of outer sealed box 811. Thus, liquid circulation pipe 204 traverses the space between inner sealed box 810 and outer sealed box 811 along at least an entire longitudinal length (i.e., the height) of inner sealed box 810. Increasing the length of liquid circulation pipe 204 as shown in FIG. 8 can further enhance the noise reduction effect, as the elasticity of the tube 204 can dampen the vibration generated by inner sealed box 810 and transmitted to outer sealed box 811.

Figure 9:
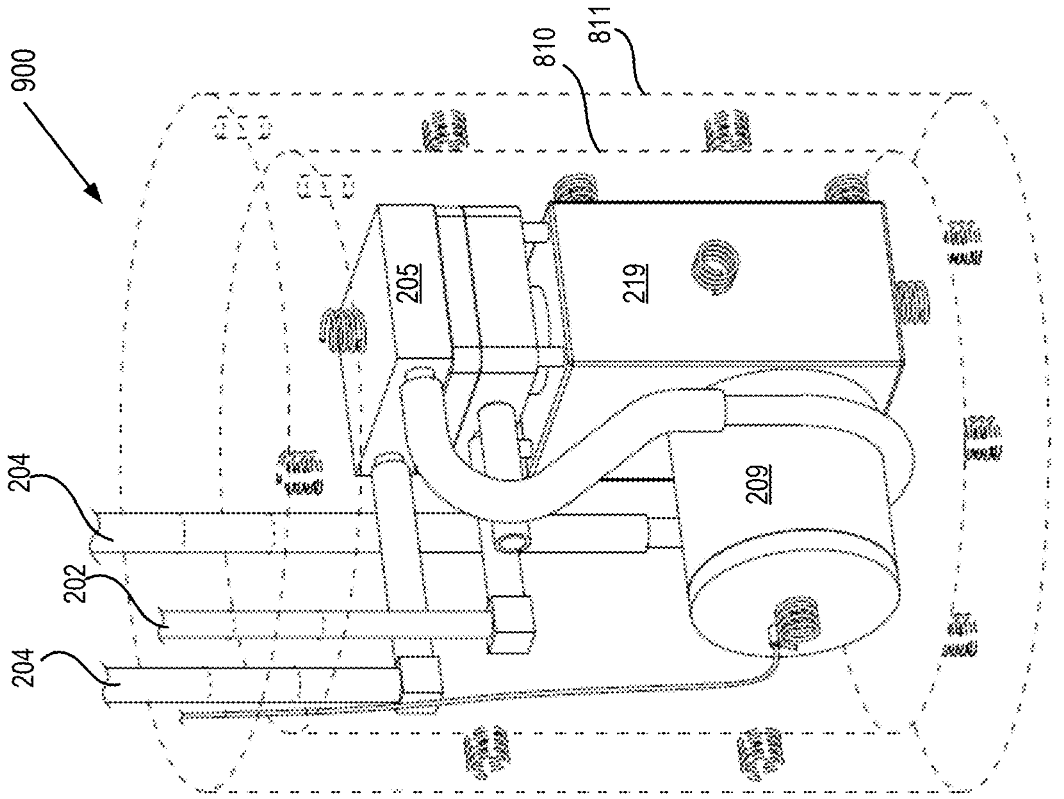
FIG. 9 is a diagram of an air pump assembly according to yet another embodiment.

FIG. 9 is a diagram of an air pump assembly according to yet another embodiment. Referring also to FIGS. 4-7, air pump assembly 900 has the same components as air pump assembly 800 except for the arrangements of air pump machinery 229 and liquid circulation pipe 204. In this embodiment, metal box 205 is positioned above compressor 219 and air pump motor 209. Liquid cooling components (e.g., liquid pump 214 and heat dissipation fins 213), which are not shown in this figure, may be located on top of outer sealed box 811. To reach the liquid cooling components, liquid circulation pipe 204 exits inner sealed box 810 and outer sealed box 811 from the same side; e.g., from the top side (the circular side) of both sealed boxes 810 and 811 as shown in the figure. This arrangement is a variation of air pump assembly 200, where liquid circulation pipe 204 exits inner sealed box 210 and outer sealed box 211 from the same side. In an alternative embodiment, liquid circulation pipe 204 may exit inner sealed box 210 and outer sealed box 211 from a same side that is different from the top side.

An air supply system has been described. The air supply system includes an air pump assembly to generate compressed air, a liquid circulation pipe to circulate a cooling liquid, a sensor, and a programmable control board. The air pump assembly includes an outer sealed box enclosing an inner sealed box, which further encloses air pump machinery. A first set of springs are disposed between the air pump machinery and the inner sealed box and a second set of springs are disposed between the outer sealed box and the inner sealed box. The liquid circulation pipe connects the air pump machinery to liquid cooling components outside the outer sealed box. The sensor is coupled to an output of the air pump assembly to measure a characteristic of the compressed air during operation. The programmable control board controls the speed of a motor in the air pump machinery according to program instructions and measurements of the sensor.

In one embodiment, the air supply system further includes an air output valve coupled to the output of the air pump assembly and an input of a spraying device. The air output valve is controlled by commands of the programmable control board. In one embodiment, the air output valve is a solenoid valve driven by current or air pressure.

In one embodiment, the air pump machinery includes the motor, a compressor driven by the motor, and a metal box through which the cooling liquid flows via the liquid circulation pipe. In one embodiment, the liquid circulation pipe exits the inner sealed box and the outer sealed box from a same side. In an alternative embodiment, the liquid circulation pipe exits the inner sealed box and the outer sealed box from opposite sides. The motor of the air pump machinery may be at least partially surrounded by a metal segment of the liquid circulation pipe. In one embodiment, the liquid circulation pipe may traverse the space between the inner sealed box and the outer sealed box along at least an entire longitudinal length of the inner sealed box.

In one embodiment, each of the inner sealed box and the outer sealed box has a three-dimensional shape that is based on one of: a square, a rectangle, a parallelogram, a circle, an oval, and an irregular shape. In one embodiment, each of the inner sealed box and the outer sealed box has a cylindrical shape. In one embodiment, the first set of springs may be attached to all sides of the inner sealed box, and the second set of springs may be attached to all sides of the air pump machinery.

In one embodiment, the air pump assembly includes multiple (e.g., more than two) sealed boxes including the outer sealed box and the inner sealed box. The multiple sealed boxes have decreasing sizes and form a set of nested boxes with springs between any adjacent two of the sealed boxes.

In one embodiment, the sensor is an air pressure sensor to measure air pressure during operation of the air pump machinery. In an alternative embodiment, the sensor is a gas flow meter to measure a flow rate of the compressed air during operation of the air pump machinery.

In one embodiment, the programmable control board receives the program instructions from a memory storage device in the air supply system to generate control signals for controlling the speed of the motor. The programmable control board receives the program instructions from a control circuit that controls operations of a spraying device to generate control signals for controlling the speed of the motor.

In one embodiment, the liquid cooling components include cooling fins through which the cooling liquid flows. The cooling fins are connected to a liquid pump that pumps the cooling liquid in the liquid circulation pipe.

Various functional components or blocks have been described herein. As will be appreciated by persons skilled in the art, the functional blocks will preferably be implemented through circuits (either dedicated circuits or general-purpose circuits, which operate under the control of one or more processors and coded instructions), which will typically comprise transistors that are configured in such a way as to control the operation of the circuitry in accordance with the functions and operations described herein.

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. An air supply system, comprising:

an air pump assembly to generate compressed air, the air pump assembly including an outer sealed box enclosing an inner sealed box, the inner box comprising a top, a bottom, and least four lateral sides, the inner sealed box further enclosing air pump machinery, the air pump machinery including a motor and a compressor driven by the motor to compress air, wherein a first set of springs are disposed between the air pump machinery and the inner sealed box around all sides including a top, a bottom, and lateral sides of the air pump machinery and are attached to the motor and the compressor, and each of the sides of the inner sealed box, and a second set of springs are disposed between the outer sealed box and the inner sealed box on all sides including the top, the bottom and the lateral sides of the inner sealed box, the second set of springs attached to each respective side of the inner sealed box and the outer sealed box;

a liquid circulation pipe to circulate a cooling liquid, the liquid circulation pipe connecting the air pump machinery to liquid cooling components outside the outer sealed box;

a sensor coupled to an output of the air pump assembly to measure a characteristic of the compressed air during operation of the air pump machinery; and a programmable control board to control a speed of the motor in the air pump machinery according to program instructions and measurements of the sensor.

2. The air supply system of claim 1, further comprising: an air output valve coupled to the output of the air pump assembly and an input of a spraying device, the air output valve controlled by commands of the programmable control board.

3. The air supply system of claim 2, wherein the air output valve is a solenoid valve driven by current or air pressure.

4. The air supply system of claim 1, wherein the air pump machinery includes the motor attached to one side of the compressor, and a metal box attached to another side of the compressor, and wherein the liquid circulation pipe carries the cooling liquid from the motor through the metal box and exits the inner sealed box.

5. The air supply system of claim 1, wherein the liquid circulation pipe exits the inner sealed box and the outer sealed box from a same side.

6. The air supply system of claim 1, wherein the liquid circulation pipe exits the inner sealed box and the outer sealed box from opposite sides.

7. The air supply system of claim 1, wherein the motor is at least partially surrounded by a metal segment of the liquid circulation pipe.

8. The air supply system of claim 1, wherein the liquid circulation pipe traverses a space between the inner sealed box and the outer sealed box along at least an entire longitudinal length of the inner sealed box.

9. The air supply system of claim 1, wherein each of the inner sealed box and the outer sealed box has a cylindrical shape.

10. The air supply system of claim 1, wherein the sensor is an air pressure sensor to measure air pressure during operation of the air pump machinery.

11. The air supply system of claim 1, wherein the sensor is a gas flow meter to measure a flow rate of the compressed air during operation of the air pump machinery.

12. The air supply system of claim 1, further comprising: a plurality of sealed boxes including the outer sealed box and the inner sealed box, the plurality of sealed boxes having decreasing sizes and forming a set of nested boxes with springs between any adjacent two of the sealed boxes.

13. The air supply system of claim 1, wherein each of the inner sealed box and the outer sealed box has a three-dimensional shape that is based on one of: a square, a rectangle, a parallelogram, a circle, an oval, and an irregular shape.

14. The air supply system of claim 1, wherein the programmable control board receives the program instructions from a memory storage device in the air supply system to generate control signals for controlling the speed of the motor.

15. The air supply system of claim 1, wherein the programmable control board receives the program instructions from a control circuit that controls operations of a spraying device to generate control signals for controlling the speed of the motor.

16. The air supply system of claim 1, wherein the liquid cooling components include cooling fins through which the cooling liquid flows, the cooling fins connected to a liquid pump that pumps the cooling liquid in the liquid circulation pipe.

17. An air supply system, comprising:

an air pump assembly to generate compressed air, the air pump assembly including an outer sealed box enclosing an inner sealed box, the inner sealed box further enclosing air pump machinery, wherein a first set of springs are disposed between the air pump machinery and the inner sealed box and a second set of springs are disposed between the outer sealed box and the inner sealed box;

a liquid circulation pipe to circulate a cooling liquid, the liquid circulation pipe connecting the air pump machinery to liquid cooling components outside the outer sealed box, wherein the liquid circulation pipe traverses a space between the inner sealed box and the outer sealed box along at least an entire longitudinal length of the inner sealed box;

a sensor coupled to an output of the air pump assembly to measure a characteristic of the compressed air during operation of the air pump machinery;

a programmable control board to control a speed of a motor in the air pump machinery according to program instructions and measurements of the sensor; and an air output valve coupled to the output of the air pump assembly and an input of a spraying device, the air output valve controlled by commands of the programmable control board.

18. The air supply system of claim 17, wherein the first set of springs are attached to all sides of the inner sealed box, and the second set of springs are attached to all sides of the air pump machinery.

* * * * *